Dec. 13, 1927.
W. F. LAUTENSCHLAGER
1,652,946
MACHINE FOR MAKING KNOTTED STITCHES
Original Filed Aug. 25, 1919   6 Sheets-Sheet 1
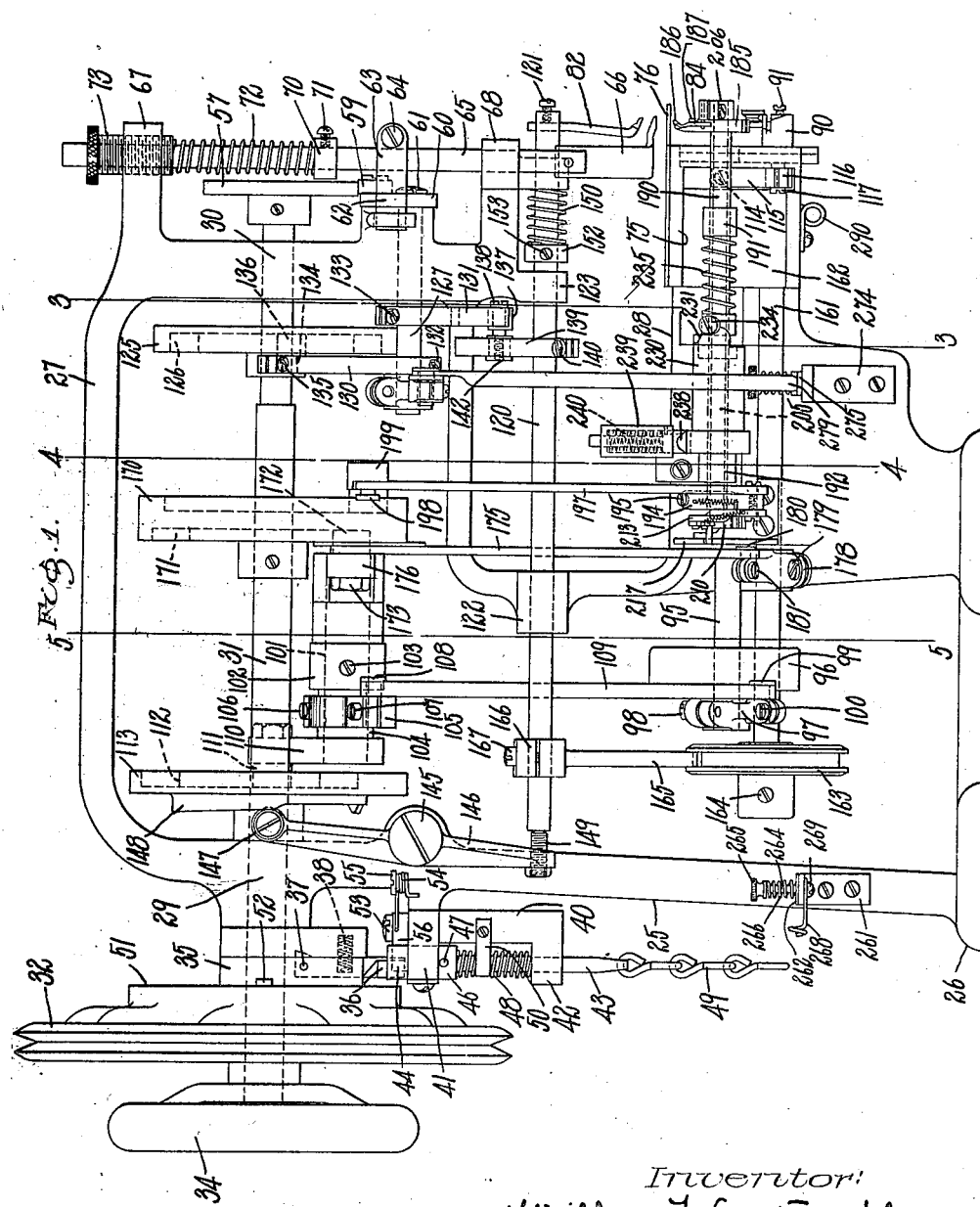
Inventor:
William F. Lautenschlager
By Francis J. Dakin
Atty.

Dec. 13, 1927.
W. F. LAUTENSCHLAGER
1,652,946
MACHINE FOR MAKING KNOTTED STITCHES
Original Filed Aug. 25, 1919    6 Sheets-Sheet 2
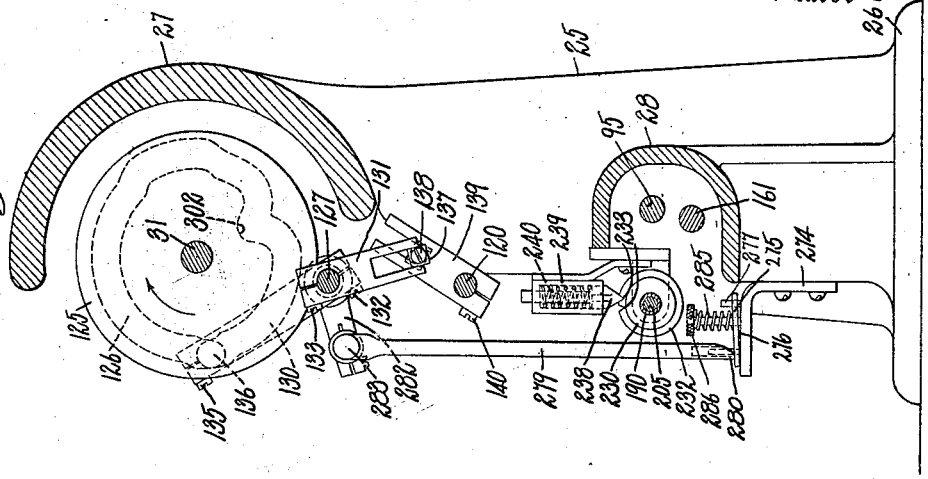
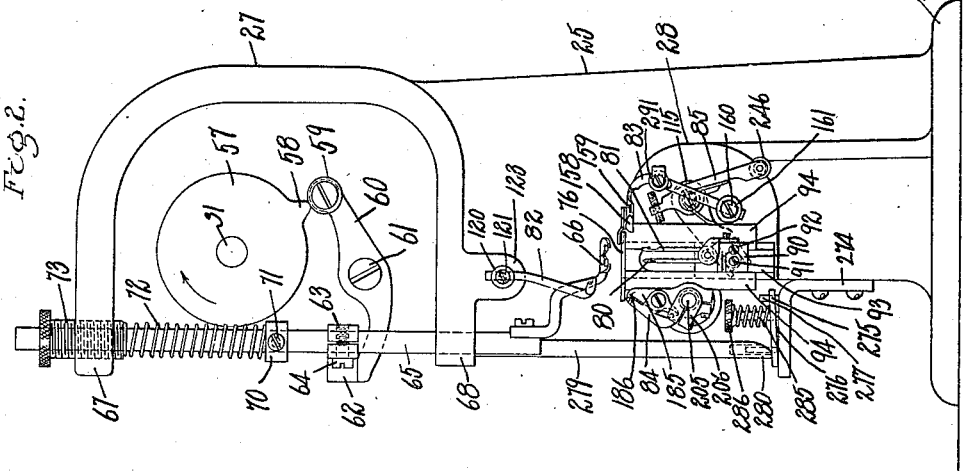
Inventor:
William F. Lautenschlager
By Francis J. V. Dakin
Atty.

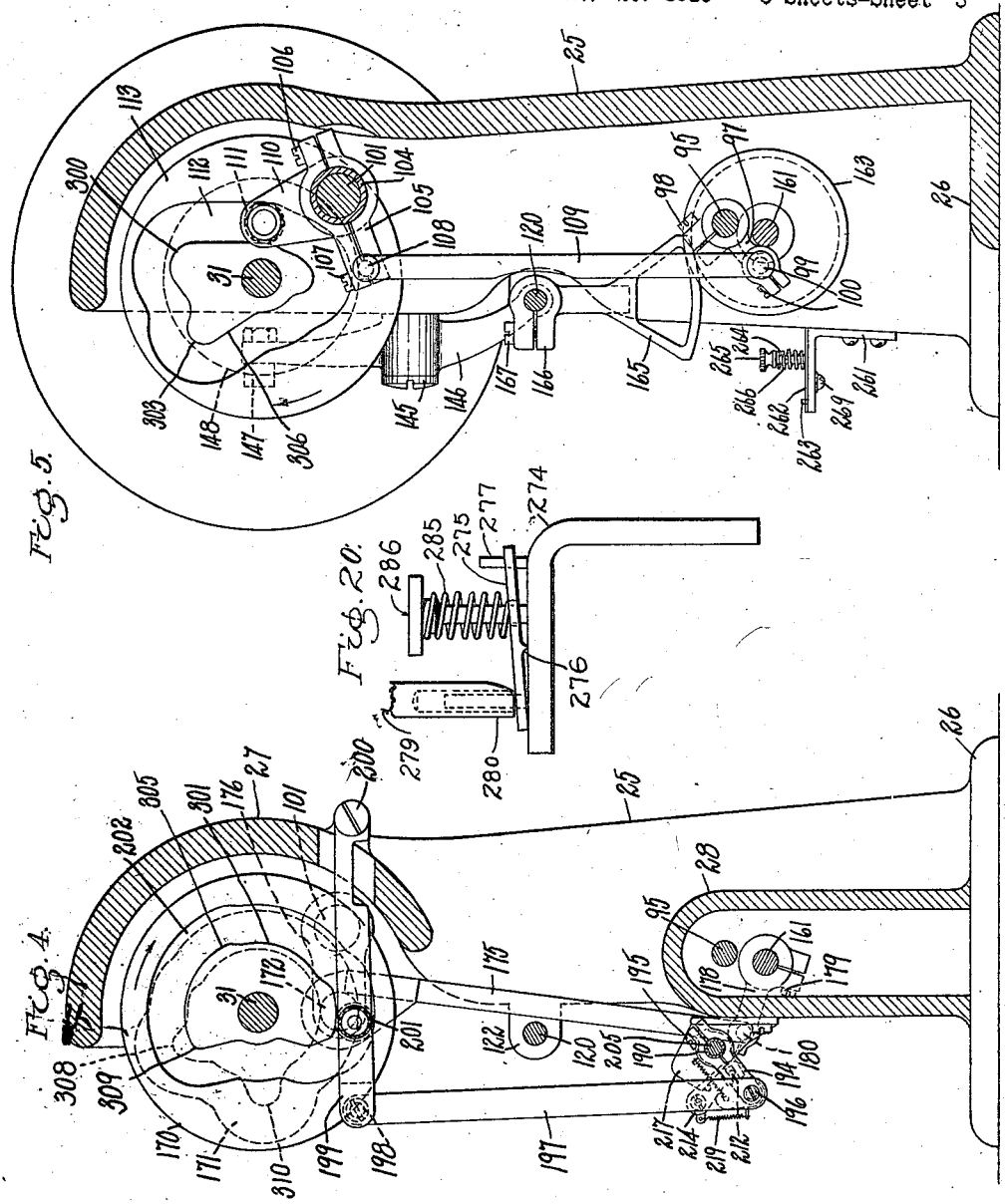

Dec. 13, 1927.

W. F. LAUTENSCHLAGER 1,652,946

MACHINE FOR MAKING KNOTTED STITCHES

Original Filed Aug. 25, 1919    6 Sheets-Sheet 4

Inventor:
William F. Lautenschlager
By Francis J. V. Dakin
Atty

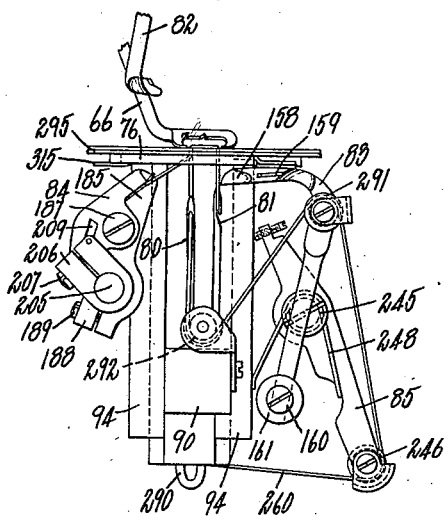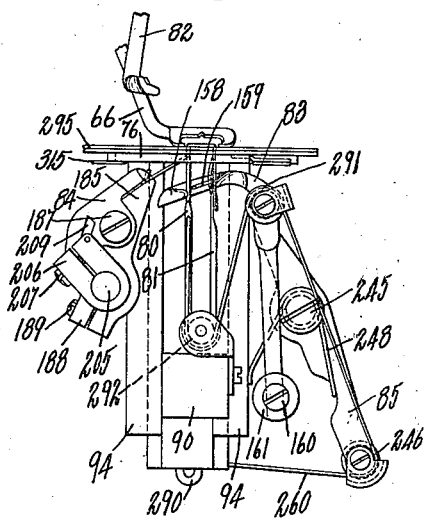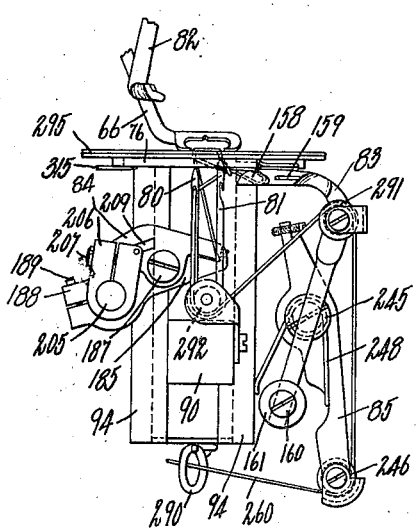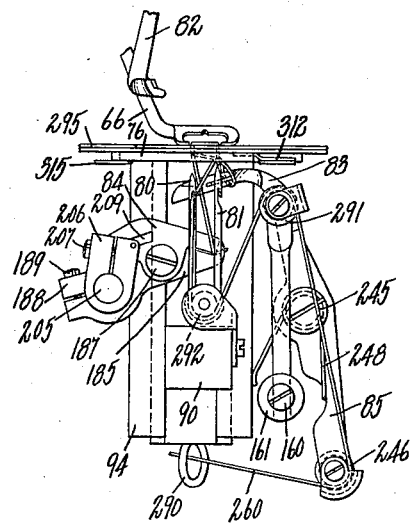

Dec. 13, 1927.
W. F. LAUTENSCHLAGER
1,652,946
MACHINE FOR MAKING KNOTTED STITCHES
Original Filed Aug. 25, 1919    6 Sheets-Sheet 6
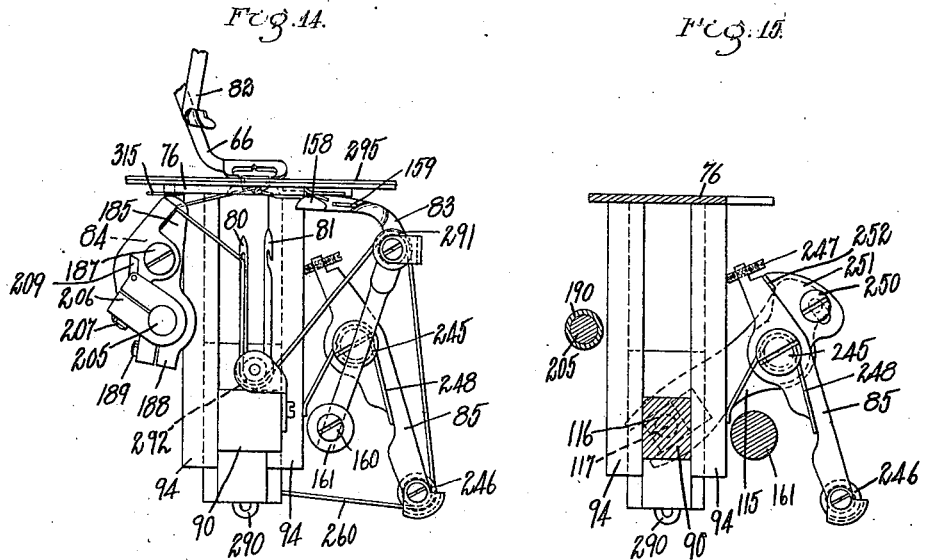
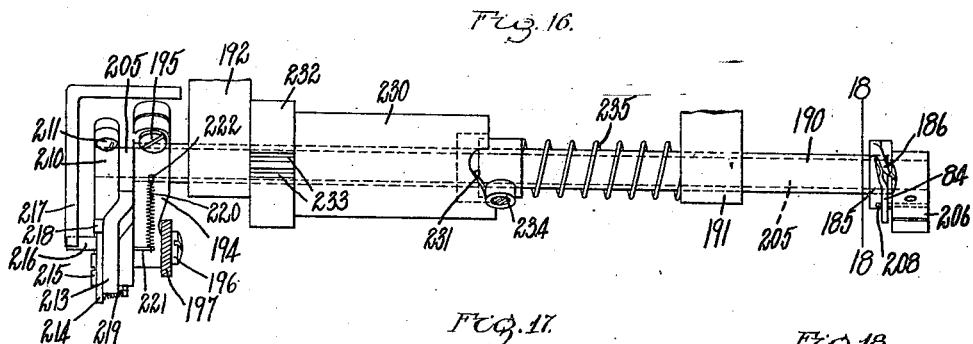
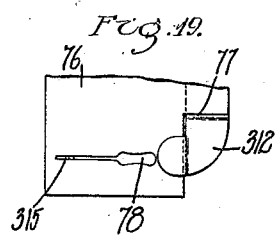
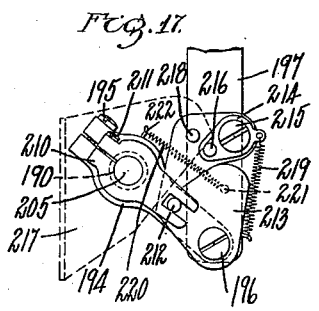
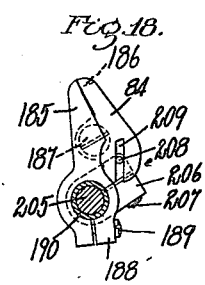
Inventor:
William F. Lautenschlager
By Francis J. V. Dakin
Atty Patented Dec. 13, 1927.

1,652,946

UNITED STATES PATENT OFFICE.

WILLIAM F. LAUTENSCHLAGER, OF CINCINNATI, OHIO.

MACHINE FOR MAKING KNOTTED STITCHES.

Application filed August 25, 1919, Serial No. 319,629. Renewed May 6, 1926.

My invention relates to a machine for making a knotted stitch and has for its object the provision of means for carrying out the method of making the knotted stitch shown and described in Letters Patent of the United States, No. 1,284,911, issued to me November 12, 1918.

The method described in said patent consists essentially in passing a primary loop of thread comprising a pair of stretches in reverse direction through the material, then passing one of the stretches of said thread through the bight portion of said primary loop as a supplemental loop, drawing on said stretch forming said supplemental loop for drawing up said primary loop whereby its bight is drawn across the stretches of said supplemental loop, passing the other of the first named stretches of said thread through said supplemental loop and then drawing upon the outer stretch of said supplemental loop for drawing its bight upon said other of said first named stretches of said thread to tighten and complete the knot.

Briefly my invention contemplates a machine having a suitable throat-plate to hold the material in which the knotted stitch is to be formed, with two upright needles, one an eye needle and the other a hook needle, mounted on a suitable reciprocating carrier below the throat-plate. The thread is passed through the eye needle, the free end being held by a gripper, and between the needle and the source of supply are arranged a suitable take-up and other devices for maintaining a tension on the supply thread and for holding and releasing it at appropriate times. After the eye needle has been threaded the starting of the machine causes the two needles to be moved upwardly through the throat-plate and the material, the eye needle carrying the thread through the material. After reaching the end of the upward movement, the needles dip thereby causing a loop to be formed in the thread on the eye needle and thereupon a pivoted looper swings into the loop and carries it over the hook needle which then raises, catches the loop which is tightened about the hook by the automatic take-up, and pulls it downwardly through the material in a reverse direction, the take-up releasing the supply thread, thus forming a primary loop. After the primary loop is formed beneath the material, a pivoted latched looper arranged beneath the throat-plate swings forwardly through the primary loop and against the supply stretch of thread, catches it in its hooked nose and carries it back through the primary loop thereby forming a supplemental loop. After the latched looper has pulled the supplemental loop through the primary loop, the gripper is turned to exert a pull on the end of the other stretch of thread held by it in order to draw up the primary loop and to tighten its bight over the stretches of the supplemental loop. While the primary loop is being drawn taut by the gripper, the lower latched looper remains quiescent with the supplemental loop still held in its hooked nose, but as soon as said operation is completed, the said looper again moves forwardly, the latch permitting a disengagement between the looper and the supplemental loop, and on this second forward movement, the looper engages and catches the end of the thread held by the gripper. The latched looper then moves back carrying the gripper thread with it and the gripper after moving with the thread a slight distance releases it and the looper carries it through the supplemental loop and beyond to a point where the thread binds between the upper surface of the looper and the gripper plate on the throat-plate. While the end of the thread is so held, the gripper has moved forward and seized the supply stretch of the thread which also forms one stretch of the supplemental loop and then the gripper moves back pulling on the supply stretch and drawing the supplemental loop taut to bind the free end of the thread held between the looper and the nipper plate whereby the knot is tightened and completed. A stationary knife blade is secured under the throat-plate in such position that when the work is taken out of the machine the thread is drawn against the knife blade and cut.

It will be noticed that my invention contemplates a machine having certain operating instrumentalities such as a pair of needles, one an eye and the other a hook needle, an upper looper and a lower latched looper, a gripper and an automatic take-up with suitable tension, holding and releasing devices for the thread all designed to form the knotted stitch, on the one hand, and certain actuating mechanisms for giving the operating parts their appropriate movements, on the other hand.

In the drawing illustrating the preferred embodiment of my invention, Figure 1 is a side elevation of a machine constructed and operated in accordance with my invention, the operator sitting at the right and facing that end of the machine;

Figure 2 is an elevation of the front end of the machine viewed from the station of the operator, showing in addition the supplemental tension device;

Figure 3 is a vertical sectional view on line 3—3 in Figure 1, looking from right to left, showing particularly the cam and mechanism for locking the upper looper shaft;

Figure 4 is a similar view on line 4—4 in Figure 1, looking from right to left, showing particularly the cam for locking the gripper mechanism and the lower looper shaft;

Figure 5 is a similar view on line 5—5 in Figure 1, looking from right to left, showing particularly the cam for locking the needle-carrier shaft to reciprocate the needle-carrier and for imparting longitudinal movement to both the upper and lower looper shafts;

Figure 6:
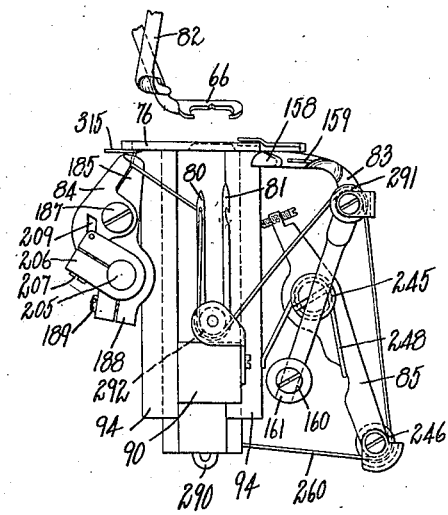

Figures 6 to 14 inclusive are front elevations, on an enlarged scale, of the operating parts showing their various positions at different stages in the forming of a single knotted stitch;

Figure 15 is a front elevation, on an enlarged scale, of the take-up and stops;

Figure 16 is a plan view, on an enlarged scale, of the gripper and its actuating mechanism;

Figure 17 is an end elevation, looking from left to right in Figure 16, of the gripper mechanism, the fixed cam-plate being shown in dotted lines;

Figure 18 is an elevation of the gripper on line 18—18 in Figure 16 looking from left to right; and Figure 19 is a plan view of the work-plate and nipper-plate.

Figure 20 is a side elevation on an enlarged scale of the supplemental tension device.

Referring to the drawings, the frame of the machine comprises a standard 25 having a suitable base 26, whereby the machine may be secured to a work-bench or table, and two arms extending forwardly toward the operator, one, 27, being the upper arm and the other, 28, being the lower arm. Through the standard 25 and upper arm 27 is journalled at 29 and 30 a main shaft 31 which is provided at its rear end with an idler pulley 32 by which power from any suitable source may be applied to the machine. A hand-wheel 34 may, if desired, be mounted on the extreme rear end of the main shaft 31 to enable the machine to be turned over by hand whenever necessary. Any suitable clutch mechanism may be employed for transmitting power from the idler pulley to the main shaft. In the form shown, a rectangular member 35 is fixedly mounted on the shaft 31 between the idler pulley 32 and the frame, said member being provided with a suitable central longitudinal recess opening toward the idler pulley within which is pivotally mounted on a pin 37 a tongue 36 which projects downwardly (when the machine is at the starting point) from the member 35 and has an oblique face. A spring 38 within the recess tends to press the tongue 36 outwardly toward the idler pulley. A bracket 40, which may be a part of the frame, is provided with two right-angled extensions 41 and 42 and through these extensions is vertically mounted a short rod 43 carrying on its upper end a block 44 having that face adjacent to the tongue 36 oblique. A collar 46 is adjustably secured to the short rod 43 by a screw 47 and a helical spring 48 is mounted on the rod between the collar and the lower extension 42 of the bracket 40. A chain 49 may be attached to the lower end of the rod 43, the chain being connected to a treadle, not shown, whereby the chain, rod and block may be pulled downwardly against the pressure of the spring 48 to release the tongue 36 and start the machine. When the pressure on the treadle is removed, the spring 48 forces the block 44 upwardly in position to engage the tongue 36, throw it out and stop the machine. A stop-bar 50 may be secured to the bracket in order to limit the downward movement of the rod and block. The idler pulley 32 is provided with a flange 51 midway its circumference and hub, said flange carrying a lug 52 which is adapted to engage the tongue 36 after it has been released by the pulling down of the block 44 and has been thrown outwardly toward the idler pulley by the spring 38.

On the top of the bracket 40 is arranged a buffer plate 56 which is pivotally mounted on a screw 53 at its farther end as viewed in Figure 1. The plate 56 has a central opening to receive a small stud (neither of which are shown) set in the top of the bracket 40. The hole is slightly larger than the stud to allow a limited pivotal movement of the plate. A spring 54 secured on a screw 55 is arranged to press the buffer plate toward the idler pulley. When the machine is stopped suddenly and the tongue 36 engages the block 44, the buffer plate prevents the tongue 36 overrunning the block, thereby insuring the stopping of the machine at the same point on all occasions. The clutch mechanism forms no part of my invention, however, and any suitable clutch device may be substituted for that shown.

Upon the forward end of the main shaft 31 is mounted a circular cam 57 having a projection 58, this cam being so arranged that when the clutch is in starting position with the tongue 36 in engagement with the block 44, the projection 58 is in engagement with a roll 59 mounted on one end of an arm 60 pivotally mounted on a stud 61 on the forward end of the upper arm. The other end of the arm 60 engages a block 62 integral with a split collar 63 secured by a screw 64 to a presser-foot rod 65 carrying a presser-foot 66 for holding the work down upon the work-plate during the operation of the machine. The throw of the presser-foot 66 may be regulated by releasing the screw 64 and by adjusting the presser-foot rod vertically in the split collar 63 and then tightening the screw 64 to hold the rod in its adjusted position. There is a certain amount of lost motion between the roll 59 and the periphery of the cam 57 when the roll is out of engagement with the projection 58 and this lost motion allows for a differential drop of the presser-foot to take care of materials of various thicknesses. The presser-foot rod is movably mounted in bearings at 67 and 68 in the forward end of the upper arm and to throw the presser-foot rod and presser-foot downwardly after the machine has been started, a collar 70 is mounted on the presser-foot rod and adjustably secured in position by a set screw 71 and between the collar 70 and the bearing 67 a helical spring 72 is arranged on the rod, under compression, so that the presser-foot rod will be forced downwardly when the roll 59 slips off the projection 58 on the cam 57. A hollow adjusting nut 73 may be threaded through the frame at 67 to permit the pressure exerted by the spring 72 to be adjusted in order that the pressure of the presser-foot on the material may be regulated.

Upon the end of the lower arm is mounted a bracket 75 carrying a small work-support 76, the work-support being provided with a cut away portion 77, for a purpose to be hereinafter explained, and a transverse slot 78 to permit the needles to pass through. (Fig. 19.)

The operating instrumentalities include an eye needle 80, a hook needle 81, an upper looper 82, a lower latched looper 83, a gripper 84 and an automatic take-up 85, all arranged in a co-operative relation on the front end of the lower arm 28, and all, excepting the upper looper 82, being arranged below the work-plate. All of these parts are given their appropriate movements at the desired times by means of various connections operated from a plurality of cams mounted upon the main shaft. Since each of these operating instrumentalities has its own actuating mechanisms connected to the main shaft, it will conduce to clearness in the following description to describe each of these instrumentalities with its particular actuating mechanism under a sub-head. It is also believed that such an arrangement will permit of easy reference for a description of any particular mechanism.

The needles.

The two needles 80 and 81, which are of usual and well known form, are set upright in a carrier 90 and secured therein by set screws 91 and 92. The carrier is in the form of a block provided with lateral vertical tongues 93 which engage and slide in vertical grooved guideways 94, 94, the needles having merely a vertical reciprocating movement. For imparting this movement at desired times the following means are provided. A shaft 95 is journalled in a suitable bearing 96 and in the end of the lower arm 28 and this shaft is rocked from the main shaft 31. On the rear end of the shaft 95 is mounted a short arm 97 having its ends each in the form of a split collar. One of these split collars embraces the shaft 95 to which it is secured by a screw 98 and the other at the free end of the arm carries a headed pin 99 to which it is fastened by the screw 100. A short shaft 101 is mounted in a boss 102 projecting from the inner side of the frame at or near the junction of the upper arm 27 with the standard 25 and is held there by a screw 103. Upon the rear end of this short shaft is rotatably mounted a sleeve 104 and to the sleeve is fixed a short arm 105 made in two parts to embrace the sleeve 104 and fastened together by screws 106 and 107. In the free end of this arm is held by a screw 107 a headed pin 108. The pins 99 and 108 are connected together by a rod 109 whereby the arms 97 and 105 move in unison. On the rearward side of the arm 105 there is mounted on the sleeve 104 an upwardly extending arm 110 carrying a roll 111 which travels in a cam path 112 on the forward face of a cam 113 mounted on the main shaft 31. The rotation of the main shaft and the cam 113 causes the roll to move toward and from the main shaft and to rock the arm 110, and through the medium of the arm 108, rod 109 and arm 97 the shaft 95 is given a rocking movement.

For the purpose of utilizing the rocking movement of the shaft 95 to raise and lower the needle carrier 90 and needles, the following means is provided. Upon the forward end of the shaft 95 is secured by a screw 114 a short arm 115 having its free end in the form of a yoke within which is slidably mounted a block 116 carried on a pin 117 which is screwed into the rear face of the needle carrier 90. When the shaft 95 is rocked the arm 115 is turned thereby causing the carrier 90 to be reciprocated vertically on the guideways 94, 94. As the arm 115 is pivotally turned the block 116 slides in the yoke to and from the shaft 95 as it is moved in a vertical direction with the carrier.

The upper looper.

The upper looper 82 is set in the forward end of a shaft 120 and held therein by a set screw 121. This shaft is mounted in a bearing 122 in the standard 25 and in a depending yoke bearing 123 formed on the under side of the upper arm, and has two movements, one a rocking movement and the other a longitudinal movement, in order to throw the looper over in an oblique direction to catch the loop in the eye needle and carry it to the hook needle in the beginning of the operation of the machine. This shaft receives both of these movements from cams on the main shaft. The rocking movement is accomplished by the following means. A cam 125 having a cam path 126 is mounted on the main shaft near its forward end. Upon a short shaft 127 journalled in the forward end of the upper arm 27 are fixed two short arms 130 and 131 secured to the shaft by screws 132 and 133 respectively. The arm 130 carries at its upper end a pin 134 secured in the split end of the arm by a screw 135, which pin carries a roll 136 travelling in the cam path 126. The lower arm is in the form of a yoke and within the yoke is slidably located a block 137 mounted on a pin 138. Upon the shaft 120 is mounted a similar arm 139 secured thereto by its split end with a screw 140 and having its upper end in the form of a yoke in which moves a block 142 mounted on said pin 138. The two arms 130 and 131, which may, if preferred, be in the form of a bell-crank lever, move in unison and through the medium of these two arms the cam 125 and the arm 139, the shaft 120 is given a rocking movement at appropriate times.

In addition to the rocking movement, the shaft 120 has also a longitudinal movement in order to throw the looper in an oblique direction when necessary, the oblique direction being the resultant of the rocking and longitudinal movements of the shaft. To accomplish this end there is pivotally mounted on a screw 145 set in the standard 25 a lever 146 the upper end of which carries a roll 147 in engagement with a cam surface 148 on the rear face of the cam 113. The lower end of the lever 146 is bored to receive a headed screw 149 screwed into the end of the shaft 120. The rotation of the cam 113, therefore, oscillates the lever 146 on its pivot 145 imparting to the shaft 120 a longitudinal movement. In order to maintain the shaft in a rearward position and the roll 147 in engagement with the cam surface of the cam 113 a helical spring 150 is mounted on the shaft 120 and abuts at its forward end one leg of the yoke bearing 123 and at its rearward end a collar 152 adjustably fastened to the shaft 120 by a screw 153. This spring is under pressure at all times and acts to throw the shaft 120 rearwardly and to maintain the roll 147 in engagement with the cam 113. The blocks 137 and 142 are of sufficient size to permit the necessary longitudinal movement of the shaft 120 without disconnecting the two arms 131 and 139.

The lower latched looper.

The lower latched looper 83 is provided with a pointed nose 158 and latch 159 and is of a well known form. It is secured by a screw 160 to the forward end of a shaft 161 rotatably journalled in a bearing 96 and in the forward end of the lower arm 28 at 162. The shaft 161 is similar to the shaft 120 for operating the upper looper in that it has two movements, a longitudinal and a rocking movement, for imparting a diagonal movement to the lower looper when necessary.

The longitudinal movement of the lower looper shaft is attained by hitching it to the upper looper shaft 120. Upon the rear end of the lower looper shaft 161 is mounted a wheel 163 which is fastened to the shaft by means of a screw 164 set in the hub of the wheel. The wheel 163 is provided with an annular groove on its periphery in which rides a triangular skeleton arm 165 which is provided with a shank ending in a split collar 166 fastened to the upper looper shaft 120 by means of a screw 167. When the upper looper shaft 120 is moved in either direction longitudinally, the arm 165, by means of the grooved wheel 163, carries the lower looper shaft 161 with it and throughout the operation of the machine the two looper shafts have a longitudinal movement in unison. The fact that the arm 165 rides idly in the groove on the wheel 163 permits the two looper shafts to have a rocking movement independently of each other. In the operation of the machine the upper looper acts first after which it ceases to perform any function and then the lower looper performs its functions; therefore the longitudinal movements of both shafts are partly effective for each.

To rock the shaft 161 to throw the lower latched looper forward and back, a cam 170 (see Fig. 4) is mounted midway on the main shaft 31 having a pathway 171 in its rearward face in which rides a roll 172 loosely mounted on a pin 173 which passes through one end of a depending rod 175 and through the end of a short arm 176 loosely mounted upon the short shaft 101. Upon the shaft 161 is secured a short arm 178 which has its two ends in the form of split collars, one of which embraces the shaft 161 and is fastened thereto by a screw 179 and the other of which embraces a pin 180 and is fastened thereto by a screw 181. The pin 180 extends through the lower end of the rod 175, so that the lower looper shaft 161 is rocked through the medium of the arm 178, rod 175, arm 176, cam roll 172 by the cam 170.

The gripper.

The gripper 84 is provided for holding the free end of the thread in the first instance, but it performs various other functions during the progress of the stitch such as giving more thread by approaching the needles and drawing up the thread to tighten the knot and finally gripping the supply stretch of thread to be in position to start another stitch with the free end of the thread gripped.

The gripper is made up of two jaws, an upper jaw designated as 84 and a lower jaw 185 having a hooked nose 186 which is offset and lies over and away from the nose of the upper jaw 84 when the jaws are closed. The upper jaw 84 is pivoted on a screw-stud 187 set in the lower jaw. The lower jaw is provided with a split collar 188 whereby it is fastened by a screw 189 upon a hollow shaft 190 loosely journalled in brackets 191 and 192 on the lower arm of the machine. On its rear end the hollow shaft has a short arm 194, one end of which is in the form of a split collar surrounding the hollow shaft and held tight thereon by a screw 195, the other end of which is bored to receive a pin 196 by which the short arm is connected to a depending rod 197 connected at its upper end by a pin 198 to an arm 199 pivotally mounted at its other end on a pin 200 set in the upper arm of the machine. Midway the arm 199 is provided with a roll 201 which travels in a pathway 202 on the forward face of the cam 170. By these means the hollow shaft carrying the lower jaw of the gripper is given a rocking movement at certain times during the operation of the machine.

Within the hollow shaft is mounted a solid shaft 205 carrying on its forward end a split collar 206 fastened to the solid shaft by a screw 207. On the rearward face of the split collar 206 is a pin 208 which projects into a straight slot 209 in the upper jaw 84 of the gripper. The two jaws of the gripper are, therefore, one mounted on the hollow shaft and one controlled by the solid shaft so that to get the opening and closing movements of the gripper it is necessary to secure a relative movement between the solid shaft and the hollow shaft. For this purpose I provide certain elements forming a link connection between the two so that at appropriate times the jaws of the gripper may be opened and closed. These means comprise the following: Upon the rear end of the solid shaft 205 is an arm 210 secured to the shaft by a screw 211 and having its free end in the form of a yoke to receive a pin 212 carried by a plate 213, which in turn is pivotally mounted on the pin 196 in the end of the arm 194 secured to the hollow shaft 190. On the upper portion of the plate 213 is loosely mounted a dog 214 pivoted on a screw 215 and provided with a projecting pin 216 adapted to ride on the edge of a cam-plate 217 fixed to the lower arm. A stop-pin 218 set in the plate 213 limits the movement of the dog in one direction and a small light spring 219 secured at one end to the top of the dog and at the other end to the plate 213, tends to hold the dog against the stop-pin 218. On the forward face of the plate 213 there is arranged a strong spring 220 secured at one end to a pin 221 set in the plate 213 and at the other end to a pin 222 set in the split collar portion of the arm 194. This last spring being under tension tends to hold the plate downwardly toward the hollow shaft so that the arms 194 and 210 are in alignment, which is the normal position for the closing of the jaws of the gripper. The hollow shaft is rocked by the reciprocating rod 197 and the solid shaft moves with it except when moved by the cam and dog. The heavy spring 220 keeps the jaws of the gripper closed at all times until the cam works against it. On the upward movement of the rod 197 the jaws of the gripper are closed and the solid shaft and hollow shaft and the two arms 194 and 210 move in unison, the dog 214 moving upwardly with the pin 216 sliding upwardly along the lower edge of the fixed cam plate 217, with the spring 219 tending to keep the pin 216 in engagement with the edge of the fixed cam plate 217. As the two arms 194 and 210 with the plate 213 between them are carried upwardly by the upward movement of the rod 197, the pin 216 on the dog 214 passes over the top of the fixed cam plate 217 and then the spring 219 pulls the dog around until the pin 216 on the dog is in engagement with the stop 218. On the downward movement of the rod 197 and arms 194 and 210, the pin 216 on the dog 214 strikes the top edge of the cam plate 217. The top edge of the cam plate 217 slopes upwardly and outwardly so that as the arms continue to descend the dog 214, held against the stop-pin 218, operates to raise the rear portion of the plate 213 and thereby the pin 212 to pivot the plate on the pin 196. The pin 212 thereby carries the yoked arm 210 out of alignment with the arm 194 and upwardly, thereby turning the solid shaft 205, and through the medium of the pin 208, opening the jaw 84 on its pivot 187. As the downward movement continues, the pin 216 slips over the top portion of the cam and down and allows the spring 220 to return the hollow shaft and solid shaft to their normal relation and the jaws of the gripper to be closed.

In the operation of the gripper, I have found it necessary in order that the gripper may properly seize and grip the thread, to turn it toward the needles in a course which is slightly rearward from the course pursued in its return; that is, it is necessary to throw the gripper over (from left to right as viewed by the operator) in one path and return it in a path which is nearer the operator. Both paths are in a general diagonal relation so that the gripper may pass in the rear of the needles. To accomplish this result I provide a cylindrical cam 230 loosely mounted on the hollow shaft 190 and having its forward edge 231 irregularly cut to form a cam-surface as shown in Figure 16. At its rearward end the cam 230 abuts against the bracket 192 and is provided with a hub 232 of greater diameter than the cam, which is provided with two V-shaped longitudinal notches 233 arranged in close proximity to each other. In the hollow shaft is set a screw 234 adapted to engage the cam edge 231, a spring 235 being mounted on the hollow shaft between said screw and the bracket 191 to maintain said screw in engagement with the cam edge 231 and the hollow shaft in proper longitudinal position. The cam edge 231 comprises less than ninety degrees of the end of the cam and at each end of the cam edge, it terminates in right-angled projections so the screw 234 will turn the cam from one position to the other.

For locking the cam 230 in one position or the other, I provide a bolt 238 having a bevelled edge adapted to engage the notches 233 in the cam. The bolt is mounted in a vertical housing 239 arranged above the cam and fastened to the lower arm in any suitable manner. The shank of the bolt is reduced and within the housing 239 and around the shank is arranged a helical spring 240 under pressure which abuts against the top of the housing and the enlarged head of the bolt to press it downwardly.

When the hollow shaft 190 and gripper mechanism is rocked to throw the gripper forwardly and behind the needles, it starts from the position shown in the elevation view, Figure 17, and the screw 234 rides on the cam edge 231. It will be noticed that this cam edge slopes to the rear of the machine, so that the spring 235 keeps the screw in engagement with the cam edge and causes the gripper mechanism to be moved longitudinally toward the rear of the machine. At the beginning of this movement the bolt is in the upper notch (referring to Fig. 16), and just before the gripper mechanism has reached the end of its rocking movement the screw 234 engages the right-angled projection at the end of the cam edge and then turns the cam until the bolt slips into the lower notch which should be at the end of the rocking movement. This results in throwing the inclined cam edge 231 upwardly (Fig. 16) and consequently when the gripper mechanism returns, the screw 234 and the gripper are thrown longitudinally in a path which is above the cam edge shown in Fig. 16. It will be apparent from the foregoing description that on its return journey the gripper moves in a path which is nearer to the operator than the path in which it moved when starting out, and it is this difference in the paths which enables the gripper to pass by and avoid the thread on its outward journey and to catch it on its return.

The automatic take-up.

For controlling the supply and tension of the thread in making the knotted stitch, I provide, primarily, an automatic take-up. There are in addition suitable tension devices which will be described hereinafter. The automatic take-up comprises a lever 85 loosely and pivotally mounted nearer its upper end than its lower end on a screw 245 set in the end of the needle carrier shaft 95. (See Fig. 15.) The lower end of the lever carries a sheave 246 over which the thread travels and its upper end has threaded therethrough a small screw stop 247 which is adapted to engage the right hand guideway 94 when the lower end of the lever 85 is thrown to the right. A spring 248 is provided for normally holding the take-up or lever 85 in this position. The arm 115 on the needle carrier shaft 95 is extended beyond the shaft to the right and upon this extension is secured by a screw 250 a thin plate 251 having a right-angled forward projection 252 which acts as a stop for the take-up 85. The location of this stop, since it is on a movable part, will depend on the position of the arm 115 and needle carrier 90. When the latter is raised the stop 252 is thrown to the right, (Fig. 15), and allows a greater movement of the take-up.

The take-up is automatically operated by the movement of the parts of the machine, and any strain on the supply stretch of thread will cause the take-up to move over until the screw stop 247 engages the guideway and in this manner the take-up will give a certain amount of thread.

Threading of the machine.

As before stated, certain tension devices in addition to the automatic take-up are used in connection with my machine, and these may be described in detail in connection with an explanation of the threading of the machine.

A spool of suitable thread, not shown, may be arranged on any suitable spindle or other support near the machine. From the spool the thread 260 passes through a tension device mounted at a convenient place on the machine, preferably at the rear, which comprises a bracket 261 secured to the standard 25, upon which is loosely placed a plate 262. A pin 263 and an upright stud 264 both set in the upper face of the bracket 261 serve to hold the plate 262 against lateral movement. The head of the stud 264 is threaded to receive a nut 265 and a helical spring 266 is arranged on the stud abutting at one end the plate 262 and at the other end the nut 265. By turning the nut 265 one way or the other the pressure exerted by the spring 266 upon the plate 262 may be adjusted. The thread passes between the bracket 261 and plate 262 and the tension is therefore regulated by manipulating the nut 265. A wire coil 268 is fastened to the bracket by a screw 269 and serves as a guide for the thread. From this tension device, which is intended to hold the thread under a constant light tension merely to prevent the thread loosening, the thread passes through a supplemental tension device, automatically operated from the main shaft of the machine.

This supplemental tension device consists of a bracket 274 fastened to the lower arm of the machine, upon which is mounted a small plate 275 having a slight boss 276 on its under side so that it may be rocked on this boss as a pivot. A pin 277 set in the bracket 274 projecting upwardly through a hole in the plate locates the plate at one end or fixes it in position, and at its outer end, it is bored to receive the reduced end of a vertically depending rod 279 having a shoulder 280 adapted to engage the outer end of the plate and press it downwardly against the bracket when the rod is in a lowermost position. At its upper end the rod 279 is connected to a short arm 282 which has its outer end in the form of a split collar in which is mounted a pin 283. The short arm is fixed on the short shaft 127 so that it moves in unison with the arms controlling the upper looper. When the rod 279 is in an uppermost position, a spring 285 mounted on a threaded screw 286 set in the bracket 274 passing through a hole in the plate, tends to press the inner end of the plate downwardly and hold the thread 260. From this auxiliary tension device the thread passes through an eye 290 on the under side of the lower arm. From the eye 290, the thread passes over the sheave 246 on the lower end of the take-up, then over a hooded sheave 291 on the lower looper 83, thence down and through a pulley 292 on the needle carrier 90, thence upwardly through the eye of the eye needle 80 to the gripper where the end of the thread is held tightly between the jaws.

*The operation of the machine.*

In the drawings, Figures 1 to 6 inclusive, the parts of the machine are shown in normal position with the clutch thrown out of engagement with the idler pulley. In Figures 6 to 14 inclusive I have shown the operative parts, on an enlarged scale, as viewed from the operator's seat, in their various positions at different stages in the making of a knotted stitch.

In Figure 6 the parts are shown in normal position while the machine is at rest. The main shaft 30 makes and completes a knotted stitch with each complete revolution. So long as the treadle is depressed, the machine continues to operate, making a series of complete stitches. The machine is without feeding means, the work being fed by hand, and when the treadle is released the machine completes that particular stitch and stops in the position shown in the drawings. In this figure the presser-foot is raised and the needle carrier is in its lowest position. Both of the loopers and the gripper are in retracted position and the stop 247 of the take-up is in engagement with the guideway. The machine is shown as threaded and ready to start as soon as the material in which the knotted stitch is to be made is placed in position on the work-support under the presser-foot. After the work is placed on the work-support and under the presser-foot, the treadle is depressed and the machine started. As the main shaft turns, the projection 58 on the cam 57 rides off the roll 59 permitting the spring 72 to drop the presser-foot 66 down to hold the work. The cam 113 rotates and the roll 111 in the pathway 112 (see Fig. 5) is thrown from left to right, raising the rod 109 and arm 97 and rocking the needle-carrier shaft 95. The needle-carrier is thereby moved upwardly and the needles pass through the slot in the work-plate and through the material 295, the eye needle carrying the thread through the material. When the roll 111 has reached the high point 300 on the cam 113 the needle-carrier has attained its highest point.

Meanwhile the roll 201 on the arm 199 has passed along a low place 301 on the cam 170 which causes the arm 197 to be slightly raised, thereby throwing the gripper inwardly towards the needles to slacken the thread. At the same time, the raising of the needle-carrier arm 115 throws the stop 252 over to the right, (Fig. 15) which allows the lower end of the take-up 84 to move toward the guideway and in that manner to release a certain amount of thread to permit the eye needle to carry up the loop through the material. At this point the parts are in the position shown in Fig. 7, the needles having reached the highest point and the take-up having returned to its normal position with the stop 247 in engagement with the guideway.

Figure 7:
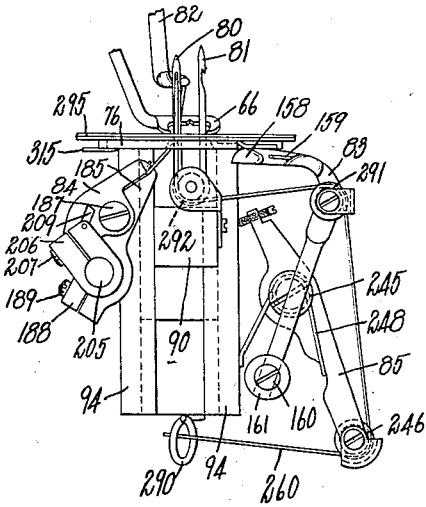
Figure 8:
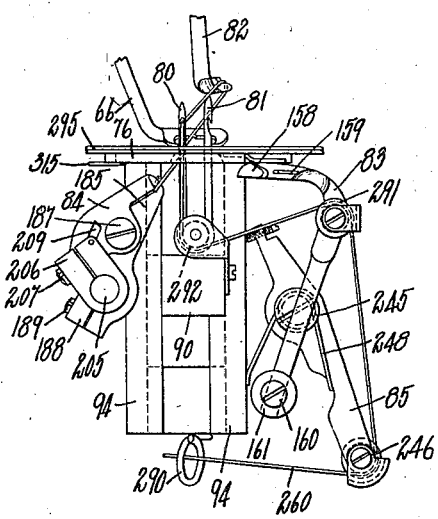
Figure 9:
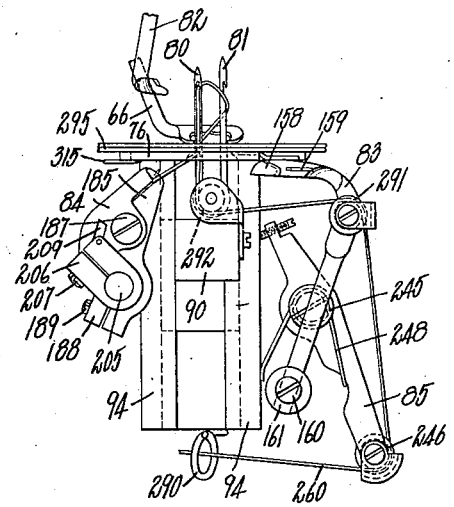

After reaching the point 300 on the cam 113 the roll 111 next strikes a depressed portion in the cam, thereby causing the needle-carrier to drop slightly and the needles to dip. This causes a loop to be formed in the thread in the eye needle and as this loop is formed the upper looper is thrown from left to right, its nose passing through the loop, catching the loop, and carrying it up above the hook needle. In Fig. 7, in order to illustrate the operation of the looper, I have shown the hooked nose of the upper looper 82 within the loop, but, as a matter of fact, this does not happen until the needles dip. When the roll 136 engages a depressed portion 302 in the pathway 126 on the cam 125, the arm 130 (see Fig. 3) is thrown from left to right, thereby, through the medium of the arms 131 and 130, rocking the upper looper shaft 120 and throwing the looper over in a diagonal direction to carry the loop in the thread over the top of the hook needle into the position shown in Fig. 8. When the looper carries the loop over the hook needle, the lower portion of the automatic take-up again moves from right to left releasing the thread to permit the loop to be taken and at the completion of the movement of the upper looper the take-up returns to its normal position. In Fig. 8 the needles are shown at the end of the dip with the nose of the gripper still thrown over toward the needles. At this point the needle carrier is again raised, due to the fact that the roll 111 strikes another high point 303 in the cam 113, and the hook needle passes through the loop, whereupon the upper looper is thrown back to its normal position leaving the loop over the hook needle. After the hook needle has ascended through the loop of thread, the gripper is turned slightly away from the needle carrier, thereby tightening the thread around the hook needle in order that the hook may catch the loop. This slight retraction of the gripper is accomplished by the raised point 305 in the cam 170.

After the thread has been tightened by the gripper around the hook needle, the cam-roll 111 engages a decline 306 in the cam 113 and the needle-carrier is dropped, the hook needle drawing the loop of thread down through the material to a point below the work-plate as shown in Fig. 10. This completes the primary loop.

Up to this point the lower latched looper 83 has remained quiescent, the cam-path 171 in the rear face of the cam 170 being circular up to this point with the main shaft 31 as a center, so that the lower looper shaft 161 has no rocking movement. (See Fig. 4.) Before the needle-carrier 90 reaches the end of its downward movement, the cam-roll 172 strikes the inclined part 308 in the cam pathway 171 and through the medium of the rod 175 which is thrown downwardly, the lower looper shaft 161 is rocked, throwing the lower looper over from right to left. In this movement the nose of the looper passes through the primary loop above the hook needle until it reaches the position shown in Fig. 11 where its hooked nose has passed beyond that stretch of the primary loop passing upwardly from the eye needle. In Fig. 10 the lower looper is shown as having started on its forward movement and in Fig. 11 as having completed it.

From the position shown in Fig. 11, the lower looper is retracted and its hooked nose catches the stretch of the primary loop passing upwardly from the eye needle and carries it from left to right through the primary loop thereby forming a supplemental loop. When the lower looper is in its extreme forward position, as shown in Fig. 11, the latch has passed through the primary loop and on the rearward movement of the looper the primary loop rides on the latch over the hooked nose and is not caught thereby.

While the lower looper is travelling from left to right, the roll 201 in the cam-path 202 in the cam 170 reaches point 309 and starts to approach the main shaft 31 raising the arm 199 and rod 197 and throwing the gripper inwardly toward the needles and downwardly. The latter part of this movement takes place after the looper has drawn the supplemental loop through the primary loop and as the gripper carries between its jaws one of the stretches of the primary loop, the final downward movement of the gripper exerts a pull on this stretch and draws the primary loop taut about the supplemental loop. While the lower looper is drawing the supplemental loop through the primary loop, the needles are raised slightly in order to give thread from the eye needle to form the supplemental loop and at the same time the take-up is released to a slight extent by the raising of the needle-carrier to give additional thread. Fig. 12 shows the positions of the parts after the primary loop has been tightened.

From this stage, the second high point 310 in the cam-path 171 on cam 170 causes the lower looper to be again thrown forward, the supplemental loop passing from under the hooked nose over the latch and back on the neck of the looper, as shown in Fig. 13. The lower looper on this second forward movement passes beyond the stretch of thread still held in the jaws of the gripper into a position where its hooked nose may, when it retracts, catch said stretch of thread. Fig. 13 shows the positions at this point.

In Fig. 14 the knot is shown completed. From the positions in Fig. 13, the lower looper catches the stretch held by the gripper, which simultaneously opens its jaws to release the end of the thread, this operation of the jaws being accomplished through the operation of the dog 214 and cam plate 217 hereinbefore described. The lower looper then carries the free end of the thread to the right and through the supplemental loop which rides over the latch and off the hooked nose of the looper.

Secured to the work-plate at the right is a small spring-plate 312 so adjusted that it nearly engages the top of the lower looper when it is in a normal position. This plate, called a nipper-plate, is used to grip the free end of the thread which is carried back through the supplemental loop by the lower looper as shown in Fig. 14. It will be noticed that the looper is thrown further to the right at this time than it was in Fig. 12, and that is for the purpose of binding and holding the free end of the thread between the looper and the nipper-plate.

While the lower looper is carrying the free end of the thread through the supplemental loop, the needle-carrier starts to drop and the gripper to rise with its jaws still open. As the eye needle moves downwardly it pulls the supplemental loop off the nose of the lower looper and after the eye needle has dropped below the nose of the gripper, the latter continuing its upward movement, catches that stretch of the supplemental loop passing through the eye needle in its hooked nose and then the jaws of the gripper close upon the thread and the continued upward movement of the gripper into the position shown in Fig. 14 draws on the stretch of thread and finally tightens the supplemental loop and completes the knot. When this has been done the parts are then all in their normal position and the main shaft has completed one revolution and the presser-foot is automatically raised up from the work. A knife 315 may be placed at any location on the work-plate so that part of the thread between the gripper and the stitch may be cut by withdrawing the work. The work may then be moved on the work-plate for the next stitch and the cycle of operations repeated indefinitely.

The machine of my invention is capable of many uses and it may, for instance, be used for sewing on flat buttons by providing suitable means, which would be apparent to one skilled in the art, for locating the eyes of the button so that the needles will pass through the eyes during the operation of the machine. By adding a suitable raceway to the machine, which would be a simple matter and apparent to anyone skilled in the art, the machine might be used for attaching shank buttons to cloth, leather or other flexible material. I have not shown a raceway in the drawings because this is merely one well known appliance which might be added to the machine for adapting it to a particular use.

What I claim is:—

1. In a machine for forming a knotted stitch, the combination of a work-support, means for passing a loop of thread comprising a pair of stretches in reverse directions through the material for forming a primary loop, means for passing one of said stretches of said thread through said primary loop as a supplemental loop, means for passing the other of the stretches of said thread through said supplemental loop and means for drawing the thread taut in order to form a knot comprising the bights of said loops and said other of said stretches in knotted relation.

2. In a machine for forming a knotted stitch, the combination of means for passing a loop of thread comprising a pair of stretches in reverse directions through the material for forming a primary loop, said means comprising a pair of needles, one being an eye needle and the other a hook needle and means for throwing a loop from said eye needle over and on said hook needle, means for passing one of said stretches of said thread through said primary loop as a supplemental loop, means for passing the other of the stretches of said thread through said supplemental loop and means for drawing the thread taut in order to form a knot comprising the bights of said loops and said other of said stretches in knotted relation.

3. In a machine for forming a knotted stitch, the combination of means for passing a loop of thread comprising a pair of stretches in reverse directions through the material for forming a primary loop, said means comprising a pair of needles, one being an eye needle and the other a hook needle and a looper for throwing a loop from said eye needle over and on said hook needle, means for passing one of said stretches of said thread through said primary loop as a supplemental loop, means for passing the other of the stretches of said thread through said supplemental loop and means for drawing the thread taut in order to form a knot comprising the bights of said loops and said other of said stretches in knotted relation.

4. In a machine for forming a knotted stitch, the combination of means for passing a loop of thread comprising a pair of stretches in reverse directions through the material for forming a primary loop, a looper for passing one of said stretches of said thread through said primary loop as a supplemental loop, means for passing the other of the stretches of said thread through said supplemental loop and means for drawing the thread taut in order to form a knot comprising the bights of said loops and said other of said stretches in knotted relation.

5. In a machine for forming a knotted stitch, the combination of means for passing a loop of thread comprising a pair of stretches in reverse directions through the material for forming a primary loop, a looper for passing one of said stretches of said thread through said primary loop as a supplemental loop and for passing the other of the stretches of said thread through the supplemental loop and means for drawing the thread taut in order to form a knot comprising the bights of said loop and said other of said stretches in knotted relation.

6. In a machine for forming a knotted stitch, the combination of means for passing a loop of thread comprising a pair of stretches in reverse directions through the material for forming a primary loop, a looper for passing one of said stretches of said thread through said primary loop as a supplemental loop and for passing the other of the stretches of said thread through the supplemental loop and means for drawing the thread taut in order to form a knot comprising the bights of said loops and said other of said stretches in knotted relation; said last mentioned means comprising a nipper plate for holding the free end of the thread tight against the looper and a gripper for seizing the supplemental loop and drawing it taut.

7. In a machine for forming a knotted stitch, the combination of means for passing a loop of thread comprising a pair of stretches in reverse directions through the material for forming a primary loop, a looper for passing one of said stretches of said thread through said primary loop as a supplemental loop and for passing the other of the stretches of said thread through the supplemental loop and means for drawing the thread taut in order to form a knot comprising the bights of said loops and said other of said stretches in knotted relation; said last mentioned means comprising a nipper plate for holding the free end of the thread tight against the looper, a gripper for seizing the supplemental loop and drawing it taut and an automatic take-up device to hold the supplemental loop against stretching when the gripper tightens it.

8. In a machine for forming a knotted stitch, the combination of a work-support, a vertically reciprocating carrier, an eye needle and a hook needle set upright on said carrier, said eye needle being adapted for passing a loop of thread comprising a pair of stretches in one direction through the material and said hook needle being adapted for passing said loop through the material in the reverse direction, an upper looper for carrying said loop of thread from the eye needle into a position adapted to be engaged by the hook needle and drawn through the material in the reverse direction to form a primary loop, means for passing one of said stretches of said thread through said primary loop as a supplemental loop, means for passing the other of said stretches of said thread through said supplemental loop and means for drawing the thread taut in knotted relation.

9. In a machine for forming a knotted stitch, the combination of a work-support, an eye needle for passing a loop of thread comprising a pair of stretches through the material in one direction, a hook needle adapted to carry said loop through the material in a reverse direction for forming a primary loop, an upper looper for taking said loop from said eye needle and carrying it into position to be engaged by said hook needle, said loop after being passed through the material in the reverse direction by said hook needle constituting a primary loop, means for passing one of said stretches of said thread through said primary loop as a supplemental loop, means for passing the other of said stretches of said thread through said supplemental loop and means for drawing the thread taut in knotted relation.

10. In a machine for forming a knotted stitch, the combination of a work-support, means for passing a loop of thread comprising a pair of stretches in reverse directions through the material for forming a primary loop, said means comprising a vertically reciprocating needle carrier, two needles set upright in said carrier, one a hook needle and the other an eye needle, and an upper looper, a lower looper for drawing one of said stretches through said primary loop as a supplemental loop and for drawing the other of said stretches through said supplemental loop and means for drawing the thread taut.

11. In a machine for forming a knotted stitch, the combination of a work-support, means for passing a loop of thread comprising a pair of stretches in reverse directions through the material for forming a primary loop, said means comprising two needles, one a hook needle and the other an eye needle, and an upper looper, a lower latched looper for drawing one of said stretches through said primary loop as a supplemental loop and for drawing the other of said stretches through said suplpemental loop and means for drawing the thread taut; said last mentioned means comprising a nipper-plate for holding the free end of the thread tight against the looper, a gripper for seizing the supplemental loop and drawing it taut and an automatic take-up device to hold the supplemental loop against stretching when the gripper tightens it.

12. In a machine for forming a knotted stitch, the combination of a work-support, an eye needle for passing a loop of thread comprising a pair of stretches through the material, a looper for carrying said loop from said eye needle over a hook needle, said hook needle for drawing said loop through the material in a reverse direction, said loop being a primary loop, means for passing one of said stretches of thread through said primary loop as a supplemental loop, means for passing the other of said stretches through said supplemental loop and means for drawing the thread taut.

13. In a machine for forming a knotted stitch, the combination of a work-support, an eye needle, a hook needle and an upper looper, all for passing a loop of thread comprising a pair of stretches in reverse directions through the material for forming a primary loop, a lower latched looper for drawing one of said stretches through said primary loop as a supplemental loop and for drawing the other of said stretches through said supplemental loop and means for drawing the thread taut to complete the knotted stitch.

14. In a machine for forming a knotted stitch, the combination of a work-support, an eye needle, a hook needle and an upper looper, all for passing a loop of thread comprising a pair of stretches in reverse directions through the material for forming a primary loop, a lower latched looper for drawing one of said stretches through said primary loop as a supplemental loop and for drawing the other of said stretches through said supplemental loop, a nipper-plate for holding the free end of the thread drawn through said supplemental loop tight against the looper, a gripper for seizing the supplemental loop and drawing it taut and an automatic take-up device to hold the supply stretch of the thread against stretching when the gripper tightens the knot.

15. In a machine for forming a knotted stitch, the combination of means for passing a loop of thread comprising a pair of stretches in reverse directions through the material for forming a primary loop, said means comprising a reciprocating needle carrier, an eye needle and a hook needle set upright therein, an upper looper and means for reciprocating said carrier and for causing it to dip at the appropriate moment, a looper for passing one of said stretches of said thread through said primary loop as a supplemental loop, means for passing the other of the stretches of said thread through said supplemental loop, means for controlling the thread and releasing it when necessary and means for drawing the thread taut in order to form a knot comprising the bights of said loops and said other of said stretches in knotted relation.

16. In a machine for forming a knotted stitch, the combination of means for passing a loop of thread comprising a pair of stretches in reverse directions through the material for forming a primary loop, a looper for passing one of said stretches of said thread through said primary loop as a supplemental loop, means for passing the other of the stretches of said thread through said supplemental loop, an automatic take-up for controlling the thread supply and releasing it when necessary and means for drawing the thread taut in order to form a knot comprising the bights of said loops and said other of said stretches in knotted relation.

17. In a machine for forming a knotted stitch, the combination of a work-support, a vertically reciprocating needle carrier, an eye needle and a hook needle mounted on said carrier, said eye needle being adapted for passing a loop of thread comprising a pair of stretches through the needle and said hook needle being adapted for drawing said loop of thread through the material in a reverse direction to form a primary loop, a looper arranged above the material for passing said loop from said eye needle to said hook needle before the same is drawn in a reverse direction through the material, a lower looper adapted to pass through said primary loop for drawing one of said stretches of said thread from said eye needle through said primary loop as a supplemental loop and for passing the other of the stretches of said thread through said supplemental loop and means for drawing the thread taut in order to form a knot comprising the bights of said loops and said other of said stretches in knotted relation.

18. In a machine for forming a knotted stitch, the combination of a work-support, a vertically reciprocating needle carrier, an eye needle and a hook needle mounted on said carrier, said eye needle being adapted for passing a loop of thread comprising a pair of stretches through the needle and said hook needle being adapted for drawing said loop of thread through the material in a reverse direction to form a primary loop, a looper arranged above the material for passing said loop from said eye needle to said hook needle before the same is drawn in a reverse direction through the material, a lower looper adapted to pass through said primary loop for drawing one of said stretches of said thread from said eye needle through said primary loop as a supplemental loop and for passing the other of the stretches of said thread through said supplemental loop and means including a gripper and an automatic take-up for drawing the thread taut in order to form a knot comprising the bights of said loops and said other of said stretches in knotted relation.

19. In a machine for forming a knotted stitch, the combination of a hollow shaft, a jaw fixed on one end of said hollow shaft, a second jaw pivotally mounted on said first jaw and co-operating therewith and a solid shaft mounted within said hollow shaft and provided with means for moving said pivoted jaw on its pivot to open said jaws.

20. In a machine for forming a knotted stitch, the combination of a hollow shaft, a jaw fixed on one end thereof, a second jaw pivotally mounted on said first mentioned jaw and co-operating therewith, and a solid shaft mounted within said hollow shaft and provided with means for moving said pivoted jaw upon its pivot to open said jaws when said solid shaft is turned in relation to said hollow shaft.

21. In a machine for forming a knotted stitch, the combination of a hollow shaft, a solid shaft mounted within said hollow shaft, a jaw fixed on one end of said hollow shaft, a second jaw pivotally mounted on said first mentioned jaw, means carried by said solid shaft for moving said pivoted jaw to open and close said jaws when said solid shaft is turned in relation to said hollow shaft, means whereby said two shafts are turned in unison and means for changing the relation of said two shafts to each other in order to open and close said jaws.

22. In a machine for forming a knotted stitch, the combination with a vertically reciprocating carrier, and an eye needle and a hook needle set in said carrier, of a pair of loopers and means for giving said loopers a pivotal movement and a lateral movement at appropriate times in the operation of the machine; said means comprising two shafts, each carrying one of said loopers, cam operated means for rocking said shafts to swing said loopers, means for reciprocating said shafts longitudinally, and means whereby shafts are moved longitudinally in unison.

23. In a machine for forming a knotted stitch, the combination of a carrier, an eye needle and a hook needle set upright in said carrier, and means for reciprocating said carrier vertically; said means comprising a block fixed on said carrier, a yoke slidably embracing said block, a rock shaft to which said yoke is secured and means whereby the said rock shaft is rocked to reciprocate said carrier.

24. In a machine for forming a knotted stitch, the combination of a carrier, an eye needle and a hook needle set upright in said carrier, and means for reciprocating said carrier vertically; said means comprising a block loosely mounted on said carrier, a yoke slidably embracing said block, a rock shaft to which said yoke is secured, a main shaft and cam operated means between said main shaft and said rock shaft whereby the latter shaft is rocked to reciprocate said carrier.

25. In a machine for forming a knotted stitch, the combination of a pair of needles mounted for vertical reciprocation, a shaft, an upper looper fixed on said shaft, a second shaft, a lower looper fixed on said second shaft, means for moving said shafts longitudinally in unison and means for rocking said shafts independently of each other.

26. In a machine for forming a knotted stitch, the combination of a pair of needles mounted for vertical reciprocation, a shaft, an upper looper on the end of said shaft, a second shaft, a lower looper on the end of said second shaft, means connecting said two shafts for longitudinal movement of said two shafts in unison, means for moving one of said shafts longitudinally and means for rocking said two shafts independently of each other.

27. In a machine for forming a knotted stitch, the combination of a pair of needles, one an eye-needle and the other a hook needle, mounted for vertical reciprocation, a shaft, an upper looper fixed on the end of said shaft, a second shaft, a lower looper fixed on the end of said second shaft, means for rocking said shafts independently of each other, means for reciprocating longitudinally one of said shafts and means for communicating said longitudinal reciprocation to the other of said shafts without interfering with their rocking movements.

28. In a machine for forming a knotted stitch, the combination of a pair of needles, one an eye-needle and the other a hook needle, mounted for vertical reciprocation, a shaft, an upper looper fixed on the end of said shaft, a second shaft, a lower looper fixed on the end of said second shaft, means for rocking said shafts independently of each other, means for reciprocating longitudinally one of said shafts and means for communicating said longitudinal reciprocation to the other of said shafts without interfering with their rocking movements; said means comprising a grooved member on one of said shafts and an arm on the other of said shafts riding in the groove in said grooved member at all times.

29. In a machine for forming a knotted stitch, the combination of a main shaft, a pair of needles, cam-operated means for reciprocating said needles vertically, a rockshaft, an upper looper fixed on said rockshaft, a second rock-shaft mounted below said first rock-shaft, a lower latched looper fixed on said second rock-shaft and cams carried by said main shaft for rocking each of said rock-shafts independently of the other.

30. In a machine for forming a knotted stitch, the combination of a main shaft, a pair of needles, cam-operated means for reciprocating said needles vertically, a rockshaft, an upper looper fixed on said rockshaft, a second rock-shaft mounted below said first rock-shaft, a lower latched looper fixed on said second rock-shaft, cams carried by said main shaft for rocking each of said rock-shafts independently of the other, means for reciprocating one of said rockshafts longitudinally without interfering with its rocking movement and interlocking means between said rock-shafts for moving them in unison longitudinally.

31. In a machine for forming a knotted stitch, the combination of a main shaft, a rock shaft mounted below said main shaft, a cam carried by said main shaft for rocking said rock shaft, means operated by said main shaft for reciprocating said rock shaft longitudinally and a latched looper fixed on the end of said rock shaft and extending upwardly.

32. In a machine for forming a knotted stitch, the combination of a hollow shaft, a jaw fixed on one end of said hollow shaft, a second jaw pivotally mounted on said first mentioned jaw, a solid shaft mounted within said hollow shaft, a pin fixed on said solid shaft for engaging a slot in said second jaw and means for rotating said hollow shaft and said solid shaft independently of each other to open and close said jaws.

33. In a machine for forming a knotted stitch, the combination of a hollow shaft, a jaw fixed on one end of said hollow shaft, a second jaw pivotally mounted on said first mentioned jaw and provided with a slot, a solid shaft mounted within said hollow shaft and rotatable independently thereof, a pin carried by said solid shaft entering said slot in said second jaw and means for moving said solid shaft independently of said hollow shaft to open and close said jaws.

In witness whereof, I hereunto set my hand this 16th day of July, 1919.

WILLIAM F. LAUTENSCHLAGER.